(12) United States Patent
Phan et al.

(10) Patent No.: US 6,475,582 B1
(45) Date of Patent: *Nov. 5, 2002

(54) CO-EXTRUDED, MULTI-LAYER TUBING MADE FROM POLYAMIDE AND OLEFIN POLYMER MATERIALS

(75) Inventors: Tam T. M. Phan, Bear, DE (US); Anthony J. DeNicola, Jr., Newark, DE (US); John C. Haylock, Schenectady, NY (US)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/517,249

(22) Filed: Mar. 2, 2000

(51) Int. Cl.[7] .............................................. B32B 27/08
(52) U.S. Cl. .................... 428/36.9; 428/516; 428/520; 524/504; 525/66; 525/92 B
(58) Field of Search ................................ 428/36.9, 516, 428/518, 520; 524/504, 492, 493, 495; 523/212; 525/66, 92 B, 101

(56) References Cited

U.S. PATENT DOCUMENTS

| | | | |
|---|---|---|---|
| 3,553,042 A | | 1/1971 | Cocco ......................... 156/50 |
| 5,380,571 A | * | 1/1995 | Ozawa et al. .............. 428/36.9 |
| 5,507,320 A | | 4/1996 | Plumley ..................... 138/126 |
| 5,807,639 A | | 9/1998 | Frappier et al. ............ 428/475 |
| 6,218,023 B1 | * | 4/2001 | DeNicola, Jr. et al. ..... 428/515 |
| 6,319,976 B1 | * | 11/2001 | DeNicola, Jr. et al. ..... 524/504 |

FOREIGN PATENT DOCUMENTS

| | | |
|---|---|---|
| FR | 2781720 | 2/2000 |
| JP | 9314767 | 9/1997 |
| WO | 0007810 | 2/2000 |

OTHER PUBLICATIONS

J.–E. Bidaux et al., "Fusion bonding of maleic anhydride grafted polypropylene to polyamide 6 via in situ block copolymer formation at the interface", *Polymer* vol. 37, No. 7, p. 1129–1136 (1996).

* cited by examiner

Primary Examiner—Harold Pyon
Assistant Examiner—Sow-Fun Hon

(57) ABSTRACT

A three-layer, co-extruded tube has (1) an inner polyamide layer, (2) a middle layer made from (a) a modified polylefin, (b) a broad molecular weight distribution propylene polymer material, (c) a graft copolymer made from a backbone of propylene polymer material to which is grafted a methyl methacrylate/methyl acrylate copolymer or a methyl methacrylate/methacrylic acid copolymer, and (d) an olefin copolymer rubber, and (3) an outer layer made from (a) a broad molecular weight distributation propylene polymer material, (b) a graft copolymer made from a backbone of propylene polymer material to which is grafted a methyl methacrylate/methyl acrylate copolymer or a methyl methacrylate/methacrylic acid copolymer, and (c) an olefin copolymer rubber. The tubing is suitable for fuel systems, high pressure tubing, and other tubing for automotive applications.

27 Claims, No Drawings

CO-EXTRUDED, MULTI-LAYER TUBING MADE FROM POLYAMIDE AND OLEFIN POLYMER MATERIALS

FIELD OF THE INVENTION

This invention relates to multi-layer tubing made from polyamide and polyolefin materials.

BACKGROUND OF THE INVENTION

Polyamides such as nylon-11 and nylon-12 have been used as a material for automobile fuel lines because of their excellent gasoline resistance, low oxygen and hydrocarbon permeability, high impact resistance, and good flexibility at low temperatures, as well as good zinc chloride (road salt) resistance. Nylon-12 also exhibits high strength under creep, and stress crack resistance, which is particularly important in fuel lines. Nylon-6 has also been tested for fuel lines, but it suffers from stress cracking when it comes into contact with galvanized parts or is exposed to road salt solution.

Since polyamides are expensive, many attempts have been made to find a less expensive material that also meets the stringent requirements for fuel line applications, e.g., low permeability to gasoline, ozone, auto-oxidized gas, and methanol/gasoline. The use of multi-layer tubing to achieve a combination of moisture barrier, oxygen barrier and low hydrocarbon permeation rate is disclosed, for example, in U.S. Pat. No. 5,507,320. A laminated hose is described that consists of an inner layer of a fluorocarbon elastomer backed by a thin layer of Teflon polymer. These layers are then reinforced by an elastomeric tie layer, a reinforcing layer and an elastomeric cover.

U.S. Pat. No. 3,553,042 discloses extrusion coating a layer of polyamide or polyolefin onto a metal-encased cable bundle to form a loose fitting tube. The tube is subsequently stretched while heating to orient and constrict the insulating sheath. One or more such sheathed cables can in turn be sheathed in polyvinyl chloride. The process is used to make insulated cable for electrical connections.

JP 9314767 discloses products useful for window frame and machine parts made by co-extrusion molding, e.g., a polypropylene base, an ethylene/butene-1 copolymer middle layer, and a poly(methyl methacrylate) outer layer. The product has good heat, moisture, and weather resistance.

However, there is still a need for a material that is less expensive than nylon but still has a desirable mechanical property balance that is comparable to nylon mono-layer tubing.

SUMMARY OF THE INVENTION

The multi-layer, co-extruded tubing of this invention comprises:
(1) an inner layer comprising a polyamide selected from the group consisting of (a) nylon-6, (b) nylon-11, (c) a nylon-6/nylon-6,6 copolymer, (d) a nylon-6/nylon-12 copolymer, and (e) nylon-12,
(2) a middle layer comprising:
   (a) greater than 1% but not greater than 15% of a graft copolymer comprising a polyolefin backbone to which is grafted a polymerized monomer selected from the group consisting of (i) an α,β-unsaturated aliphatic carboxylic acid or drivatives thereof and (ii) an α,β-unsaturated alicyclic carboxylic acid or derivatives thereof,
   (b) about 15% to about 40% of a broad molecular weight distribution propylene polymer material,
   (c) about 20% to about 40% of a graft copolymer comprising a backbone of propylene polymer material to which are grafted polymerized monomers selected from the group consisting of (i) methyl methyacrylate and methyl acrylate, and (ii) methyl methacrylate and methacrylic acid, and
   (d) about 20% to about 50% of an olefin copolymer rubber, wherein (a)+(b)+(c)+(d)=100% by weight, and
(3) an outer layer comprising:
   (a) about 25% to about 45% of a broad molecular weight distribution propylene polymer material.
   (b) about 25% to about 45% of a graft copolymer comprising a backbone of propylene polymer material to which are grafted polymerized monomers selected from the group consisting of (i) methyl methacrylate and methyl acrylate, and (ii) methyl methacrylate and methacrylic acid, and
   (c) about 20% to about 50% of an olefin copolymer rubber,
   wherein (a)+(b)+(c)=100% by weight.

The multi-layer, co-extruded tubing of this invention is suitable for fuel systems, high pressure tubing, and other tubing for automotive applications. The tubing has good flexibilty and toughness, even at temperatures as low as −40° C., good tensile strength for burst strength at high pressure, good weatherability and environmental stress cracking resistance, good moisture barrier properties and hydrocarbon resistance, and good zinc chloride resistance.

DETAILED DESCRIPTION OF THE INVENTION

The inner layer of the multi-layer tubing of this invention comprises a polyamide selected from the group consisting of (a) nylon-6, (b) nylon-11, (c) a nylon-6/nylon-6,6 copolymer, (d) a nylon-6/nylon-12 copolymer, and (e) nylon-12.

Methods for making these polyamides are well known and all are commercially available. Basically they can be obtained by polymerizing a monoamino-monocarboxylic acid or a lactam thereof having at least two carbon atoms between the amine and carboxylic acid group, or by polymerizing substantially equimolecular proportions of a diamine that contains at least two carbon atoms between the amine groups and a dicarboxylic acid; or by polymerizing a monoaminocarboxylic acid or a lactam thereof as defined above, together with substantially equimolecular proportions of a diamine and dicarboxylic acid. The dicarboxylic acid may be used in the form of a functional derivative thereof for example, an ester or acid chloride. Nylon-6 is polycaprolactam, nylon-6,6 is polyhexamethylene adipamide made from hexamethylenediamine and adipic acid, nylon 11 is polyundecanolactam, and nylon-12 is polydodecanolactam.

The polyamide provides good gasoline resistance, high strength for high bursting pressure, and low oxygen permeability.

Component (a) of middle layer (2) of the multi-layer tubing of this invention is a graft copolymer comprising a polyolefin backbone to which is grafted a polymerized monomer selected from the group consisting of (i) an α,β-unsaturated aliphatic carboxylic acid or a derivative thereof and (ii) an α,β-unsaturated alicyclic carboxylic acid or a derivative thereof Suitable polymerizable monomers include acrylic acid, methacrylic acid, maleic acid, fumaric acid, itaconic acid, endocyclo(2,2,1)-5-heptene-2,3- carboxylic acid and cis4-cyclohexene-1,2-carboxylic acid and anhydrides, esters, amides, and imides thereof Polypropylenes modified with various amounts of maleic anhydride or maleic acid are preferred and are available commercially, for example, from Uniroyal Chemical Corporation and Aristech Chemicals. The grafted polypropylenes generally contain about 0.5% to about 10% of maleic acid or maleic anhydride, based on the total weight of the modified polymer.

The graft copolymer is used in an amount of greater than 1% but not greater than 15%, preferably not greater than 10%, based on the total weight of the composition used for making layer (2).

Component (b) of middle layer (2) is a broad molecular weight distribution propylene polymer material (BMWD PP). The BMWD PP typically has a $M_w/M_n$ of about 5 to about 60, preferably about 5 to about 40; a melt flow rate of about 0.5 to about 50, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on magnesium halide in active form. The polymerization process occurs in separate and consecutive stages, and in each stage polymerization takes place in the presence of the polymer and the catalyst from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. 5,286,791, which is incorporated herein by reference.

The BMWD PP is present in an amount of about 15% to about 40%, preferably about 20% to about 35%, based on the total weight of the composition used for making layer (2).

Component (c) of the middle layer is a graft copolymer comprising a backbone of propylene polymer material to which are grafted polymerized monomers selected from the group consisting of (i) methyl methacrylate and methyl acrylate, and (ii) methyl methacrylate and methacrylic acid. A copolymer of methyl methacrylate and methyl acrylate is preferred.

The propylene polymer material that is used as the backbone of the graft copolymer can be:

(1) a homopolymer of propylene having an isotactic index greater than 80, preferably about 85 to about 99;

(2) a copolymer of propylene and an olefin selected from the group consisting of ethylene and 4–10 C alpha-olefins, provided that when the olefin is ethylene, the maximum polymerized ethylene content is about 10%, preferably about 4%, and when the olefin is a 4–10 C alpha-olefin, the maximum polymerized content thereof is about 20% by weight, preferably about 16%, the copolymer having an isotactic index greater than 85;

(3) a terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(4) an olefin polymer composition comprising:
  (a) about 10% to about 60% by weight, preferably about 15% to about 55%, of a propylene homopolymer having an isotactic index greater than 80, preferably about 85 to about 98, or a copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight, preferably about 90% to about 99%, and an isotactic index greater than 85;
  (b) about 5% to about 25% by weight, preferably about 5% to about 20%, of a copolymer of ethylene and propylene or a 4–8 C alpha-olefin that is insoluble in xylene at ambient temperature; and
  (c) about 30% to about 70% by weight, preferably about 40% to about 65%, of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight, preferably about 10% to about 60%, most preferably about 12% to about 55%, of polymerized ethylene and being soluble in xylene at ambient temperature and having an intrinsic viscosity, measured in decahydronaphthalene at 135° C., of about 1.5 to about 4.0 dl/g,
  wherein the total amount of (b) and (c), based on the total olefin polymer composition, is about 50% to about 90%, the weight ratio of (b)/(c) is less than 0.4, preferably 0.1 to 0.3, and the composition is prepared by polymerization in at least two stages and has a flexural modulus of less than 150 MPa; or (5) a thermoplastic olefin comprising:
  (a) about 10% to about 60%, preferably about 20% to about 50%, of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
  (b) about 20% to about 60%, preferably about 30% to about 50%, of an amorphous copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
  (c) about 3% to about 40%, preferably about 10% to about 20%, of a copolymer of ethylene and propylene or a 4–8 C alpha-olefin that is insoluble in xylene at ambient temperature,
  wherein the thermoplastic olefin has a flexural modulus of greater than 150 but less than 1200 MPa, preferably about 200 to about 1100 MPa, and most preferably about 200 to about 1000 MPa.

Room or ambient temperature is ~25° C.

The 4–8 C alpha-olefins useful in the preparation of (4) and (5) include, for example, butene-1, pentene-1; hexene-1; 4-methyl-1-pentene, and octene-1.

The diene, when present, is typically a butadiene; 1,4-hexadiene; 1,5-hexadiene, or ethylidenenorbornene.

Propylene polymer materials (4) and (5) can be prepared by polymerization in at least two stages, where in the first stage the propylene; propylene and ethylene; propylene and an alpha-olefin, or propylene, ethylene and an alpha-olefin are polymerized to form component (a) of (4) or (5), and in the following stages the mixtures of ethylene and propylene; ethylene and the alpha-olefin, or ethylene, propylene and the alpha-olefin, and optionally a diene, are polymerized to form components (b) and (c) of (4) or (5).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. All gas phase is the preferred method.

The preparation of propylene polymer material (4) is described in more detail in U.S. Pat. Nos. 5,212,246 and 5,409,992, which are incorporated herein by reference. The preparation of propylene polymer material (5) is described in more detail in U.S. Pat. Nos. 5,302,454 and 5,409,992, which are incorporated herein by reference.

Propylene homopolymer is the preferred propylene polymer backbone material.

The polymerized monomers comprise about 10 to about 95 parts per hundred parts of the propylene polymer material, preferably about 30 to about 95 pph. During the graft polymerization, the monomers also copolymerize to form a certain amount of free or ungrafted copolymer. The morphology of the graft copolymer is such that the propylene polymer material is the continuous or matrix phase, and the polymerized monomers, both grafted and ungrafted, are a dispersed phase.

The graft copolymer can be made according to any one of various methods. One of these methods involves-forming active grafting sites on the propylene polymer material by treatment with a peroxide or other chemical compound that is a free radical polymerization initiator, or by irradiation with high energy ionizing radiation. The free radicals produced on the polymer as a result of the chemical or irradiation treatment form the active grafting sites on the polymer and initiate the polymerization of the monomers at these sites. Graft copolymers produced by peroxide-initiated grafting methods are preferred.

Preparation of graft copolymers by contacting the polypropylene with a free radical polymerization initiator such as an organic peroxide, and at least one vinyl monomer is described in more detail in U.S. Pat. No. 5,140,074, which is incorporated herein by reference. Preparation of graft copolymers by irradiating an olefin polymer and then treating with at least one vinyl monomer is described in more detail in U.S. Pat. No. 5,411,994, which is incorporated herein by reference.

Component (c) is present in an amount of about 20% to about 40%, preferably about 25% to about 35%, based on the total weight of the composition used to make layer (2).

Component (d) of layer (2) is an olefin copolymer rubber. Suitable olefin copolymer rubbers include, for example, saturated olefin copolymer rubbers such as ethylene/propylene monomer rubbers (EPM), ethylene/octene-1, and ethylenetbutene-1 rubbers, and unsaturated olefin copolymer rubbers such as ethylene/propylene/diene monomer rubbers (EPDM). The olefin copolymer rubber can also be the olefin polymer composition (4) described under the propylene polymer materials suitable for use as the backbone of the graft copolymer in component (c) of the middle layer. The preferred olefin copolymer rubbers are ethylene/propylene, ethylene/butene-1, and ethylene/octene-1 copolymers.

The olefin copolymer rubber is present in an amount of about 20% to about 50%, preferably about 25% to about 40%, based on the total weight of the composition used for making layer (2).

In layer (2), (a)+(b)+(c)+(d)=100% by weight.

The middle layer acts as a tie layer between the polyamide inner layer and the polyolefin outer layer. It also provides flexibility and impact resistance.

Outer layer (3) of the multilayer tubing of this invention comprises:

(a) about 25 to about 45%, preferably about 30% to about 40%, of a broad molecular weight distribution propylene polymer material.

(b) about 25% to about 45%, preferably about 300% to about 40%, of a graft copolymer comprising a backbone of propylene polymer material to which are grafted polymerized monomers selected from the group consisting of (i) methyl methacrylate and methyl acrylate, and (ii) methyl methacrylate and methacrylic acid, and (c) about 20% to about 50%, preferably about 25% to about 45%, of an olefin copolymer rubber, wherein (a)+(b)+(c)=100% by weight.

The broad molecular weight distribution propylene polymer material, the graft copolymer, and the olefin copolymer rubber are the same as those described for layer (2).

The wall thickness and outside diameter of the tubing depend upon the end use application, but must conform to the specifications of SAE J844, where the outside diameter, wall thickness, and tolerance are given for a specific burst pressure.

The outer layer provides good flexibility, good low temperature impact resistance, good moisture barrier properties, and good weatherability.

Other additives such as pigments, slip agents, waxes, oils, antiblocking agents, and antioxidants can also be present in the compositions used to make the middle and outer layers containing the polyolefin materials. If good weatherability is desired in the outer layer, a UV stabilizer master batch such as the one described in Example 1 can be used.

The multi-layer tubing is made by a co-extrusion process using three separate extruders with a different resin fed into each extruder, a three layer tube die, a vacuum bath with calibrator and cooling water collar, and a tube haul-off for winding and cutting. As needed, low air pressure can also be used at the die to control the inside tube diameter. calibration of the tube outside diameter and cooling take place at the same time in a vacuum bath. The tube coming out of the extruder die passes through a curtain of water sprayed at the entrance to the calibrator and into the cooling bath. The water spray lubricates the tube before the tube enters the calibrator and ensures even cooling. Care must be taken so that no splashes of water reach the tube prior to the curtain of water or the surface of the tube will become marred.

Performance of the multilayer tube was evaluated according to the following test methods:

(1) Air burst test at room temperature (SAE J844—part 9.10).

(2) Fluid burst test at room temperature (SAE J2043—7.1 or SAE J2260—part 7.2.1). Water at room temperature was used as the testing fluid.

(3) Cold temperature drop weight impact (SAE J2260—part 7.6 and SAE J844— 9.11). The drop weight impact test was performed after conditioning at −40° C. for 2–4 hours.

(4) Adhesion test (SAE J844—part 9.12.3).

(5) Methanol/gasoline exposure test (SAE J1681 and SAE J2260—part 7.7 and 7.7.1.2).

(6) Zinc chloride resistance test (SAE J844—part 9.6 and SAE J2260—part 7.5).

Bent tubes were immersed for 200 hours at 23° C. in a 50/50 zinc chloride/water solution.

Isotactic index is defined as the % of the polymer insoluble in xylene. The weight percent of olefin polymer soluble in xylene at room temperature is determined by dissolving 2.5 g of the polymer in 250 ml of xylene at room temperature in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity is measured in decahydronaphthalene at 135° C.

The melt flow rate of the propylene polymer materials was determined according to ASTM method D-1238 at 230° C. and 2.16 kg.

The porosity of the propylene homopolymer used as the backbone polymer in the manufacture of the graft copolymers in the examples was measured as described in Winslow, N. M. and Shapiro, J. J., "An Instrument for the Measurement of Pore-Size Distribution by Mercury Penetration," ASTM Bull., TP 49, 39–44 February 1959), and Rootare, H. M., Eds., *Advanced Experimental Techniques in Powder Metallurgy*, Plenum Press, New York, 1970.

All parts and percentages in this specification are by weight unless otherwise noted.

EXAMPLE 1

This example describes the results of the air burst test at room temperature for three-layer tubes made from four different compositions for the skin or outer layer and three different types of nylon for the core or inner layer.

In this and all of following examples, the tubing was made to conform with the requirements of SAE J844 with an outside diameter (OD) of 5/16". The layer thickness distribution in this and the following examples was 20/20/60 for the inner/middle/outer layers.

In Table 1, polymer composition A comprised:

(a) 30.14% of propylene homopolymer grafted with methyl methacrylate-co-methyl acrylate, (b) 24.40% of a broad molecular weight distribution propylene homopolymer (BMWD PP), (c) 24.40% of an olefin polymer composition commercially available from Montell USA Inc. comprising (i) 33% propylene-ethylene random copolymer having an ethylene content of 3.3% and an isotactic index, defined as the xylene insoluble fraction, of 94, (ii) 8.3% semi-crystalline ethylene-propylene copolymer fraction containing ~83% ethylene, and (iii) 58.7% amorphous ethylene-propylene copolymer fraction containing ~22% ethylene, (d) 20.01% of Engage 8150 ethylene/octene elastomer containing 25% octene, commercially available from DuPont Dow Elastomers, and (e) 1.05% of a UV stabilizer masterbatch.

In this and the following examples the propylene homopolymer used as the backbone polymer for the graft copolymer in the skin or outer layer and in the tie or middle layer had the following properties: spherical form, melt flow rate (MFR) of 10 dg/min at 230° C. and 2.16 kg, 0.44 cm$^3$/g porosity, 96.5% insoluble in xylene at room temperature, $M_w/M_n=5$.

The graft copolymer used in polymer compositions A–D was prepared as follows. The monomers (95.6/4.4 methyl methacrylate/methyl acrylate) were grafted onto the propylene homopolymer backbone at a grafting temperature of 114° C. using the previously described peroxide-initiated graft polymerization process. Ninety-five parts by weight monomers were added per 100 parts of polypropylene (pph) Tert-butylperoxy-2-ethyl hexanoate (2.1 pph active peroxide, 50% in mineral spirits) was used as the peroxide initiator. The methyl methacrylate (MMA) and methyl acrylate were premixed and fed at 1.0 pph/min for 95 minutes. A monomer to initiator ratio of 120 was used. After addition of monomers was complete, the temperature was raised to 140° C. for an additional 60 to 120 minutes under a nitrogen purge until the amount of unreacted MMA in the product was <500 parts per million.

The BMWD PP had a MFR of 1.1 g/10 min, xylene insolubles at room temperature of 97.8%, and $M_w/M_n>6$, and is commercially available from Montell USA Inc.

The UV stabilizer master batch comprised 0.20 parts of Irganox LC20FF antioxidant per hundred parts of the polymers in the composition (pph); 0.05 pph Pationic 1240 modified calcium salt derived from lactic acid, commercially available from Patco Polymer Additives Division of American Ingredients Company; 0.30 pph of Tinuvin 328 antioxidant, 0.25 pph Tinuvin 770 antioxidant, and 0.25 pph Chimassorb 119 antioxidant. The Tinuvin and Chimassorb antioxidants are all commercially available from Ciba Specialty Chemicals Company.

Irganox LC20 FF antioxidant was in free flowing form, consisted of 50% Irganox 1010 antioxidant and 50% Irgafos 12 antioxidant, and is commercially available from Ciba Specialty Chemicals Company.

Polymer composition B comprised:

(a) 32.66% of the graft copolymer described above, (b) 36.29% of the BMWD PP described above, (c) 30% of the ethylene/octene elastomer described above, and (d) 1.05% of the UV stabilizer master batch described above.

Polymer composition C comprised:

(a) 37.52% of the graft copolymer described above, (b) 41.42% of the BMWD PP described above, (c) 20.01% of the ethylene/octene elastomer described above, and (d) 1.05% of the UV stabilizer master batch described above.

Polymer composition D comprised:

(a) 25.12% of the graft copolymer described above, (b) 19.61% of the BMWD PP described above, (c) 23.97% of the olefin polymer composition described above, (d) 20.12% of the ethylene/octene elastomer described above, (e) 1.05% of the UV stabilizer master batch described above, and (f) 10.13% of MP1000 maleated polypropylene commercially available from Uniroyal Chemical Corporation. The polymer has a maleic anhydride content of about 1% by wt. and a MFR of about 1000 dg/min at 230° C.

Three types of nylon were used for the core or inner layer: Grilamid L25W40NZ844 nylon-12 (nylon-12A) and Grilamid L25W40X nylon-12 (nylon-12B), both commercially available from EMS-American Grilon Inc., and Ultramid B36 nylon-6, commercially available from BASF. All nylons were used as supplied.

All materials for the middle and outer layers were simultaneously dry-blended and bag mixed with the UV stabilizer master batch. Compounding was performed on a Leistritz 30 mm twin-screw extruder at 475° F., 275 rpm, and 30 lb/hr throughput. The compounded material was then pelletized. Pelletized materials were dried overnight at 150° F. before co-extrusion. The polyamide was dried in a desiccant drying oven at 175° F. (80° C.) overnight or at least 3 hours prior to co-extrusion.

The three-layer tubes were made by co-extrusion of the three compositions described above, under the following conditions:

|  | Extruder #1 Skin layer | Extruder #2 Tie-layer | Extruder #3 Core-layer |
| --- | --- | --- | --- |
| Screw diameter | 1 inch | 1 inch | 1 inch |
| L/D ratio | 24:1 | 24:1 | 30:1 |
| Temperatures, Barrel | | | |
| Zone 1 (° F.) | 425 | 450 | 455 |
| Zone 2 | 450 | 430 | 465 |
| Zone 3 | 440 | 445 | 450 |
| Die 1 temperature (° F.) | 440 | 440 | 440 |
| Die 2 temperature (° F.) | 440 | 440 | 440 |
| Melt temperature (° F.) | 450 | 475 | 470 |
| RPM | 111.2 | 53.7 | 31 |
| Die pressure (psi) | 1795 | 1840 | 1970 |
| Vacuum | Yes | Yes | Yes |
| Water temperature (° F.) | 90 | | |
| Line speed | 20 ft/min. | | |
| Layer thickness (in) | 0.024 | 0.008 | 0.008 |
| Layer thickness (mm) | 0.612 | 0.204 | 0.204 |
| Tube nominal OD (in) | 5/16 | | |
| Max. tube outside diameter | 0.316" or 8.03 mm | | |
| Tube inside diameter | 0.232" or 5.89 mm | | |
| Wall thickness & tolerance (in) | 0.040 +/−0.004 | | |
| Wall thickness & tolerance (mm) | 1.02 +/−0.10 | | |

TABLE 1

| Sample | Outer Layer | Middle Layer | Inner Layer | Burst Pressure (psi) |
| --- | --- | --- | --- | --- |
| 1 | A | D | Nylon-12A | 650 |
| 2 | A | D | Nylon-12B | 700 |
| 3 | B | D | Nylon-12B | 800 |
| 4 | C | D | Nylon-12B | 900 |
| 5 | A | D | Nylon-6 | 900 |
| 6 | B | D | Nylon-6 | 900 |
| Comp. 7 | A | A | A | 550 |
| Comp. 8 | B | B | B | 750 |
| Comp. 9 | Nylon-12B | Nylon-12B | Nylon-12B | 900 |

The data show that at the same tube outside diameter and layer thickness, samples 4, 5, and 6 of the three-layer tubing of this invention with either nylon-12 or nylon-6 as the inner layer, burst at the same pressure as the nylon-12 mono-layer tube prepared using the method and the equipment described in this example.

EXAMPLE 2

This example describes the results of the liquid burst pressure test for three-layer tubes made from four different compositions for the skin or outer layer and three different types of nylon for the core or inner layer. The nominal outside diameter of the tube, the layer thickness distribution, and the wall thickness of the tube were the same as in Example 1.

Polymer compositions A–D were the same as described in Example 1. The nylon-12A, -12B, and -6 were the same as those used in Example 1.

The materials for the various layers were compounded and the various compositions were co-extruded as described in Example 1.

The test procedure does not specify the liquid burst pressure based on tube outside diameter. The required pressure is determined by the end user. However, SAE J2260—Part 7.1 and SAE J2043—Part 7.1 state that the lower 3-sigma burst pressure should be 35500 KPa or 500 psi. Therefore the test was performed at 500 psi for 15 seconds. The test was continued with increasing pressure if the tube did not burst, and the final burst pressure was recorded. The results of the liquid burst pressure test are given in Table 2.

TABLE 2

| Sample | Outer Layer | Middle Layer | Inner Layer | Burst Pressure (psi) |
| --- | --- | --- | --- | --- |
| 1 | A | D | Nylon-12A | 680 |
| 2 | A | D | Nylon-12B | 820 |
| 3 | B | D | Nylon-12B | 900 |
| 4 | C | D | Nylon-12B | 950 |
| 5 | A | D | Nylon-6 | 1000 |
| 6 | B | D | Nylon-6 | 1000 |
| Comp. 7 | A | A | A | 600 |
| Comp. 8 | B | B | B | 800 |
| Comp. 9 | Nylon-12B | Nylon-12B | Nylon-12B | 1000 |

The data show that samples 3–6 of the three-layer tubing of this invention burst at a pressure comparable to that of the nylon-12 mono-layer tube. All samples burst at a pressure well above the target minimum of 500 psi required for fuel line applications.

EXAMPLE 3

This example describes the results of the air pressure burst test at 23° C. after the drop weight impact test at −40° C. The three-layer tubes were made from four different compositions for the skin or outer layer and three different types of nylon for the core or inner layer. The nominal outside diameter of the tube, the layer thickness distribution, and the wall thickness of the tube were the same as in Example 1.

Polymer compositions A–D were the same as described in Example 1. The nylon-12A, -12B, and -6 were the same as those used in Example 1.

The materials for the various layers were compounded, and the various compositions were co-extruded as described in Example 1.

The results of the air burst pressure test are given in Table 3. The air burst pressure test at 23° C. was performed only if there were no visual cracks in the tube after the drop weight impact test at −40° C. All samples passed the drop weight impact test without visual cracking. To be acceptable, the burst pressure test values after the drop weight impact test at −40° C. must be equal to or greater than 75% of the value of the burst pressure at 23° C. shown in Table 1.

TABLE 3

| Sample | Outer Layer | Middle Layer | Inner Layer | Burst Pressure (psi) |
| --- | --- | --- | --- | --- |
| 1 | A | D | Nylon-12A | 620 |
| 2 | A | D | Nylon-12B | 700 |
| 3 | B | D | Nylon-12B | 600 |
| 4 | C | D | Nylon-12B | 900 |
| 5 | A | D | Nylon-6 | 900 |
| 6 | B | D | Nylon-6 | 900 |
| Comp. 7 | A | A | A | 600 |
| Comp. 8 | B | B | B | 700 |
| Comp. 9 | Nylon-12B | Nylon-12B | Nylon-12B | 900 |

The data show that the three-layer tubing from samples 4, 5, and 6 retained its original burst pressure (burst pressure at 23° C. prior to exposure to a temperature of −40° C.) at 900 psi which is the same value as that obtained for the nylon-12B mono-layer tube.

EXAMPLE 4

This example describes the results of the adhesion test for three-layer tubes made from four different compositions for the skin or outer layer and three different types of nylon for the core or inner layer. Testing was done both prior to methanol/gasoline exposure at 23° C. and after methanol/gasoline exposure for 42 days and after the drop weight impact test at −40° C.

The nominal outside diameter of the tube, the layer thickness distribution, and the wall thickness of the tube were the same as in Example 1.

Polymer compositions A–D were the same as described in Example 1. The nylon-12A, -12B and -6 were the same as those used in Example 1.

The materials for the various layers were compounded, and the compositions were extruded as described in Example 1.

The results of the adhesion test prior to methanol/gasoline exposure at 23° C. are given in Table 4A. The results of the adhesion test after methanol/gasoline exposure for 42 days and after the drop weight impact test at −40° C. are given in Table 4B. Samples 1, 2, 3, Comparative 7, and Comparative 8 were not tested for methanol/gasoline exposure and therefore were not tested for adhesion. Excellent adhesion means that there was no separation of the layers during the adhesion test.

TABLE 4A

| Sample | Outer Layer | Middle Layer | Inner Layer | Adhesion |
| --- | --- | --- | --- | --- |
| 1 | A | D | Nylon-12A | Excellent |
| 2 | A | D | Nylon-12B | Excellent |
| 3 | B | D | Nylon-12B | Excellent |
| 4 | C | D | Nylon-12B | Bxcellent |
| 5 | A | D | Nylon-6 | Excellent |
| 6 | B | D | Nylon-6 | Excellent |
| Comp. 7 | A | A | A | Excellent |
| Comp. 8 | B | B | B | Excellent |
| Comp. 9 | Nylon-12B | Nylon-12B | Nylon-12B | Excellent |

TABLE 4B

| Sample | Outer Layer | Middle Layer | Inner Layer | Adhesion |
| --- | --- | --- | --- | --- |
| 4 | C | D | Nylon-12B | Excellent |
| 5 | A | D | Nylon-6 | Excellent |
| 6 | B | D | Nylon-6 | Excellent |
| Comp. 9 | Nylon-12B | Nylon-12B | Nylon-12B | Excellent |

The data shows that all of the three-layer tubes that were tested performed as well as the nylon-12 mono-layer tube.

EXAMPLE 5

This example describes the results of the air burst pressure test at 23° C. after methanol/gasoline exposure and the drop weight impact test at −40° C. for three-layer tubes made from four different compositions for the skin or outer layer and three different types of nylon for the core or inner layer.

The nominal outside diameter of the tube, the layer thickness distribution, and the wall thickness of the tube were the same as in Example 1.

Polymer compositions A–D were the same as described in Example 1. The nylon-12A, -12B and -6 were the same as those used in Example 1. Only the samples corresponding to 4, 5, 6, and Comparative 9 in the previous examples were tested.

The materials for the various layers were compounded and the compositions were co-extruded as described in Example 1.

The air burst pressure prior to methanol/gasoline exposure and the drop weight impact test, and the results of the air burst pressure test after the methanol/gasoline exposure test and the drop weight impact test are given in Table 5.

In Table 5, "Passed" for the methanol/gasoline exposure test means no visual crack, kink, swelling, or any other indication of deterioration during the 42 days of the methanol/gasoline test. "Passed" for the drop weight impact test at −40° C. means no visual cracks or kinks after methanol/gasoline exposure and the drop weight impact test. "Passed" for the air burst pressure test means that the sample retained at least 75% of the burst pressure prior to exposure to methanol/gasoline and prior to the drop weight impact test at 40° C.

TABLE 5

| Sample | 4 | 5 | 6 | Comp. 9 |
| --- | --- | --- | --- | --- |
| Outer layer | C | A | B | Nylon-12B |
| Middle layer | D | D | D | Nylon-12B |
| Inner layer | Nylon-12B | Nylon-6 | Nylon-6 | Nylon-12B |

TABLE 5-continued

| Sample | 4 | 5 | 6 | Comp. 9 |
|---|---|---|---|---|
| Air burst pressure prior to exposure (psi) | 900 | 900 | 900 | 900 |
| Methanol/gasoline test | Passed | Passed | Passed | Passed |
| Drop weight impact test | Passed | Passed | Passed | Passed |
| Air burst pressure (psi) | 700 | 700 | 780 | 900 |

The data show that all of the three-layer samples that were tested as well as the nylon-12B mono-layer tube maintained more than 75% of their burst pressure after exposure to methanol/gasoline and the drop weight impact test.

EXAMPLE 6

This example describes the results of the air burst pressure test at 23° C. after exposure to a 50/50 zinc chloride/water solution for 200 hours at 23° C. for three-layer tubes made from four different compositions for the skin or outer layer and three different types of nylon for the core or inner layer.

The nominal outside diameter of the tube, the layer thickness distribution, and the wall thickness of the tube were the same as in Example 1.

Polymer compositions A-D were the same as described in Example 1. The nylon-12B and nylon-6 were the same as those used in Example 1. Only the samples corresponding to 4, 5, 6, and Comparative 9 in the previous examples were tested.

The materials for the various layers were compounded, and the compositions were co-extruded as described in Example 1.

The tubes were bent before testing using the same fixture as in the resistance to kink test (SAE J2260—part 7.3). The results of the testing are given in Table 6. In Table 6, "Passed" means that the tube showed no evidence of cracking on the outside diameter, tube ends, or inner surface and at least 75% of the original pressure (burst pressure prior to ZnCl$_2$ exposure) was maintained after exposure to zinc chloride.

TABLE 6

| Sample | 4 | 5 | 6 | Comp. 9 |
|---|---|---|---|---|
| Outer layer | C | A | B | Nylon-12B |
| Middle layer | D | D | D | Nylon-12B |
| Inner layer | Nylon-12B | Nylon-6 | Nylon-6 | Nylon-12B |
| Air burst pressure (psi) | 900 | 900 | 900 | 900 |
| Pass/fail | Passed | Passed | Passed | Passed |

The data show that all of the tubes tested passed the zinc chloride resistance test without cracks after 8 days of exposure and still maintained a burst pressure of 900 psi.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A multi-layer, co-extruded tube comprising:
(1) an inner layer comprising a polyamide selected from the group consisting of (a) nylon-6, (b) nylon-11, (c) a nylon-6/nylon-6,6 copolymer, (d) a nylon-6/nylon-12 copolymer, and (e) nylon-12,
(2) a middle layer comprising:
(a) greater than 1% but not greater than 15% of a graft copolymer comprising a polyolefin backbone to which is grafted a polymerized monomer selected from the group consisting of (i) an α,β-unsaturated aliphatic carboxylic acid or derivatives thereof, and (ii) an α,β-unsaturated alicyclic carboxylic acid or derivatives thereof,
(b) about 15% to about 40% of a broad molecular weight distribution propylene polymer material, having a Mw/Mn of about 5 to about 60, a melt flow rate of about 0.5 to about 50 g/I10 min, and xylene insolubles at 25° C. of at least 94%,
(c) about 20% to about 40% of a graft copolymer comprising a backbone of propylene polymer material to which are grafted polymerized monomers selected from the group consisting of (i) methyl methacrylate and methyl acrylate, and (ii) methyl methacrylate and methacrylic acid, and
(d) about 20% to about 50% of an olefin copolymer rubber, wherein 2(a)+2(b)+2(c)+2(d)=100% by weight, and
(3) an outer layer comprising:
(a) about 25% to about 45% of a broad molecular weight distribution propylene polymer material, having a Mw/Mn of about 5 to about 60, a melt flow rate of about 0.5 to about 50 g/10 min, and xylene insolubles at 25° C. of at least 94%,
(b) about 25% to about 45% of a graft copolymer comprising a backbone of propylene polymer material to which are grafted polymerized monomers selected from the group consisting of (i) methyl methacrylate and methyl acrylate, and (ii) methyl methacrylate and methacrylic acid, and
(c) about 20% to about 50% of an olefin copolymer rubber, wherein 3(a)+3(b)+3(c)=100% by weight.

2. The tubing of claim 1 wherein (a) in the middle layer is a propylene homopolymer to which is grafted polymerized maleic acid or an anhydride thereof.

3. The tubing of claim 1 wherein (b) in the middle layer is a propylene homopolymer.

4. The tubing of claim 1 wherein the propylene polymer material backbone of the graft copolymer in middle layer (2) component (c) and outer layer (3) component (b) is selected from the group consisting of:
(a) a homopolymer of propylene having an isotactic index greater than 80;
(b) a copolymer of propylene and an olefin selected from idle group consisting of ethylene and 4–10C alpha-olefins, provided that when the olefin is ethylene, the maximum polymerized ethylene content is about 10%, and when the olefin is a 4–10C alpha-olefin, the maximum polymerized 4–10C alpha-olefin content is about 20% by weight, the copolymer having an isotactic index greater than 85;
(c) a terpolymer of propylene and two olefins selected from the group consisting of ethylene and 4–8 C alpha-olefins, provided that the maximum polymerized 4–8C alpha-olefin content is 20% by weight, and, when ethylene is one of the olefins, the maximum polymerized ethylene content is 5% by weight, the terpolymer having an isotactic index greater than 85;

(d) an olefin polymer composition comprising:
  (i) about 10% to about 60% by weight, of a propylene homopolymer having an isotactic index greater than 80, or a copolymer of monomers selected from the group consisting of (1) propylene and ethylene, (2) propylene, ethylene and a 4–8C alpha-olefin, and (3) propylene and a 4–8C alpha-olefin, the copolymer having a polymerized propylene content of more than 85% by weight, and an isotactic index greater than 85;
  (ii) about 5% to about 25% by weight, of a copolymer of ethylene and propylene or a 4–8C alpha-olefin that is insoluble in xylene at ambient temperature; and
  (iii) about 30% to about 70% by weight, of an elastomeric copolymer of monomers selected from the group consisting of (1) ethylene and propylene, (2) ethylene, propylene, and a 4–8C alpha-olefin, and (3) ethylene and a 4–8C alpha-olefin, the copolymer optionally containing about 0.5% to about 10% by weight of a polymerized diene and containing less than 70% by weight, of polymerized ethylene and being soluble in xylene at ambient temperature and having an intrinsic viscosity, measured in decahydronaphthalene at 135° C., of about 1.5 to about 4.0 dl/g,
  wherein the total amount of (ii) and (iii), based on the total olefin polymer composition, is about 50% to about 90%, the weight ratio of (ii)/(iii) is less than 0.4, and the composition is prepared by polymerization in at least two stages and has a flexural modulus of less than 150 MPa; and (e) a thermoplastic olefin comprising:
  (i) about 10% to about 60%, of a propylene homopolymer having an isotactic index greater than 80, or a copolymer of monomers selected from the group consisting of (1) ethylene and propylene, (2) ethylene, propylene and a 4–8C alpha-olefin, and (3) ethylene and a 4–8C alpha-olefin, copolymer having a polymerized propylene content greater than 85% and an isotactic index of greater than 85;
  (ii) about 20% to about 60%, of an amorphous copolymer of monomers selected from the group consisting of (1) ethylene and propylene, (2) ethylene, propylene, and a 4–8C alpha-olefin, and (3) ethylene and a 4–8C alpha-olefin, the copolymer optionally containing about 0.5% to about 10% of a polymerized diene, and containing less than 70% polymerized ethylene and being soluble in xylene at ambient temperature; and
  (iii) about 3% to about 40%, of a copolymer of ethylene and propylene or a 4–8C alpha-olefin that is insoluble in xylene at ambient temperature,
  wherein the thermoplastic olefin has a flexural modulus of greater tan 150 but less than 1200 mpa.

5. The tubing of claim 1 wherein (c) in the middle layer is a propylene homopolymer to which is grafted a methyl methacrylate/methyl acrylate copolymer.

6. The tubing of claim 1 wherein (d) in the middle layer is an ethylene/octene copolymer rubber.

7. The tubing of claim 1 wherein (a) in the outer layer is a propylene homopolymer.

8. The tubing of claim 1 wherein (b) in the outer layer is a propylene homopolymer to which is grafted a methyl methacrylate/methyl acrylate copolymer.

9. The tubing of claim 1 wherein (c) in the outer layer is an ethylene/octene copolymer rubber.

10. The tubing of claim 4 wherein component (a) has an isotactic index of from about 85 to about 99.

11. The tubing of claim 4 wherein in component (b), when the olefin is ethylene, the maximum polymerized ethylene content is about 4%.

12. The tubing of claim 4 wherein in component (b), when the olefin is a 4–10C alpha-olefin, the maximum polymerized content of the 4–10C alpha-olefin is about 16%.

13. The tubing of claim 4 wherein in component (c) the maximum polymerized 4–8C alpha-olefin content is about 16%.

14. The tubing of claim 4 wherein in component (c), when ethylene is one of the olefins, the maximum polymerized ethylene content is 4% by weight.

15. The tubing of claim 4 wherein component (d)(i) is from about 15% to about 55%.

16. The tubing of claim 4 wherein the propylene homopolymer of component (d)(i) has an isotactic index of from about 85 to about 98.

17. The tubing of claim 4 wherein in component (d)(i) the copolymer of monomers has a polymerized propylene content of from about 90% to about 99%.

18. The tubing of claim 4 wherein component (d)(ii) is from about 5% to about 20%.

19. The tubing of claim 4 wherein component (d)(iii) is from about 40% to about 65%.

20. The tubing of claim 4 wherein in component (d)(iii), the elastomeric copolymer of monomers contains from about 10% to about 60% of polymerized ethylene.

21. The tubing of claim 20 wherein the elastomeric copolymer of monomers contains from about 12% to about 55% of polymerized ethylene.

22. The tubing of claim 4 wherein the propylene homopolymer of component (e)(i) is from about 20% to about 50%.

23. The tubing of claim 4 wherein the amorphous copolymer of monomers of component (e)(ii) is from 30% to about 50%.

24. The tubing of claim 4 wherein component (e)(iii) is from about 10% to about 20%.

25. The tubing of claim 4 wherein the thermoplastic olefin has a flexural modulus of from about 200 to about 1100 MPa.

26. The tubing of claim 25 wherein the thermoplastic olefin has a flexural modulus of from about 200 to 1000 MPa.

27. The tubing of claim 4 wherein the weight ratio of component (d)(ii) to component (d)(iii) is from 0.1 to 0.3.

\* \* \* \* \*

UNITED STATES PATENT AND TRADEMARK OFFICE
CERTIFICATE OF CORRECTION

PATENT NO.    : 6,475,582 B1
DATED         : November 5, 2002
INVENTOR(S)   : Tam T. M. Phan et al.

It is certified that error appears in the above-identified patent and that said Letters Patent is hereby corrected as shown below:

Column 14,
Line 18, change "50 g/I10 min" to -- 50 g/10 min --

Signed and Sealed this

Eleventh Day of January, 2005

JON W. DUDAS
*Director of the United States Patent and Trademark Office*